United States Patent
Sorrentino

(10) Patent No.: US 9,699,752 B2
(45) Date of Patent: Jul. 4, 2017

(54) METHOD AND APPARATUS FOR DEVICE-TO-DEVICE SYNCHRONIZATION SEQUENCE PROCESSING

(71) Applicant: Telefonaktiebolaget L M Ericsson (publ), Stockholm (SE)

(72) Inventor: Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 31 days.

(21) Appl. No.: 14/435,236

(22) PCT Filed: Jan. 28, 2015

(86) PCT No.: PCT/SE2015/050087
§ 371 (c)(1),
(2) Date: Apr. 13, 2015

(87) PCT Pub. No.: WO2015/115977
PCT Pub. Date: Aug. 6, 2015

(65) Prior Publication Data
US 2016/0278031 A1 Sep. 22, 2016

Related U.S. Application Data

(60) Provisional application No. 61/934,028, filed on Jan. 31, 2014.

(51) Int. Cl.
*H04W 56/00* (2009.01)
*H04W 72/04* (2009.01)
*H04W 76/02* (2009.01)

(52) U.S. Cl.
CPC ....... *H04W 56/003* (2013.01); *H04W 56/001* (2013.01); *H04W 72/044* (2013.01); *H04W 76/025* (2013.01)

(58) Field of Classification Search
None
See application file for complete search history.

(56) References Cited

U.S. PATENT DOCUMENTS 9,232,437 B2 * 1/2016 Khoryaev ............. H04W 28/02
2011/0268101 A1 * 11/2011 Wang .................... H04L 5/0053
370/344

(Continued)

FOREIGN PATENT DOCUMENTS

WO 2011121374 A1 10/2011
WO 2012035367 A1 3/2012

(Continued)

OTHER PUBLICATIONS

3GPP, "3rd Generation Partnership Project; Technical Specification Group RAN; Study on LTE Device to Device Proximity Services—Radio Aspects; (Release 12)", 3GPP TR 36.843 V1.0.0, Nov. 2013, 1-32.

(Continued)

*Primary Examiner* — Andrew Lai
*Assistant Examiner* — Jamaal Henson
(74) *Attorney, Agent, or Firm* — Murphy, Bilak & Homiller, PLLC

(57) ABSTRACT

In one aspect of the teachings herein, a transmitter transmits synchronization signals according to one or more defined transmission characteristics that enable a receiver to distinguish the type of transmitter and/or the type of carrier used to convey the synchronization signals. Different types of transmitters reuse at least some of the same synchronization signal sequences and generation algorithms, but use different transmission parameters to impart one or more recognizable characteristics to the transmitted synchronization signals. In turn, an appropriately configured receiver "knows" which characteristics are associated with which transmitter and/or carrier types. For example, wireless (Continued)

devices operating in a wireless communication network transmit device-generated synchronization signals that reuse at least some of the same sequences used by network base stations for the transmission of network synchronization signals. However, device-generated synchronization signals are transmitted using a relative positioning or mapping that characteristically differs from that used for network synchronization signals.

16 Claims, 5 Drawing Sheets

(56) References Cited

U.S. PATENT DOCUMENTS

| | | | | |
|---|---|---|---|---|
| 2012/0140714 A1* | 6/2012 | Koskela | ............... | H04W 56/00 370/329 |
| 2014/0328329 A1* | 11/2014 | Novlan | ............... | H04W 72/042 370/336 |
| 2014/0335853 A1* | 11/2014 | Sartori | ............... | H04W 76/023 455/426.1 |
| 2015/0117375 A1* | 4/2015 | Sartori | ............... | H04W 56/001 370/329 |

FOREIGN PATENT DOCUMENTS

| | | |
|---|---|---|
| WO | 2012073131 A1 | 6/2012 |
| WO | 2014178671 A1 | 11/2014 |

OTHER PUBLICATIONS

Unknown, Author, "Synchronization Procedures for D2D Discovery and Communication", Ericsson, 3GPP TSG RAN WG1 Meeting #75, T1-135803, San Francisco, California, USA, Nov. 11-15, 2013, 1-6.

Unknown, Author, "Synchronization Signals and Channel Design for D2D Discovery and Communication", Ericsson, 3GPP TSG RAN WG1 Meeting #75, R1-135804, San Francisco, California, USA, Nov. 11-15, 2013, 1-9.

Unknown, Author, "D2D discovery design with simulation results", Qualcomm Incorporated, 3GPP TSG-RAN WG1 #74bis, R1-134627, Guangzhou, China, Oct. 7-11, 2013, 1-15.

* cited by examiner

METHOD AND APPARATUS FOR DEVICE-TO-DEVICE SYNCHRONIZATION SEQUENCE PROCESSING

TECHNICAL FIELD

The present invention generally relates to wireless communication networks, and particularly relates to the use of synchronization sequences in such networks, including device-to-device synchronization sequences.

BACKGROUND

Device-to-device communication is a well-known and widely used component of many existing wireless technologies, including ad hoc and cellular networks. Examples include Bluetooth and several variants of the IEEE 802.11 standards suite, such as WiFi Direct. These example systems operate in unlicensed spectrum Recently, the use of device-to-device (D2D) communications as an underlay to cellular networks has been proposed as a means to take advantage of the proximity of wireless devices operating within the network, while also allowing devices to operate in a controlled interference environment. In one suggested approach, D2D communications share the same spectrum as the cellular system, for example by reserving some of the cellular uplink resources for D2D communications use. However, dynamic sharing of the cellular spectrum between cellular services and D2D communications is a more likely alternative than dedicated reservation, because cellular spectrum resources are inherently scarce and because dynamic allocation provides greater network flexibility and higher spectrum efficiency.

The Third Generation Partnership Project (3GPP) refers to Network Controlled D2D as "Proximity Services" or ProSe, and efforts aimed at integrated D2D functionality into the Long Term Evolution (LTE) specifications are underway. The ProSe Study Item (SI) recommends supporting D2D operation between wireless devices—referred to as user equipments or UEs by the 3GPP—that are out of network coverage, and between in-coverage and out-of-coverage wireless devices. In such cases, certain UEs may regularly transmit synchronization signals to provide local synchronization to neighboring wireless devices.

The ProSe SI also recommends supporting inter-cell D2D scenarios, where UEs camping on possibly unsynchronized cells are able to synchronize to each other. Still further, the ProSe SI recommends that in the LTE context, D2D-capable UEs will use uplink (UL) spectrum for D2D communications, for Frequency Division Duplex (FDD) cellular spectrum, and will use UL subframes from Time Division Duplex (TDD) cellular spectrum. Consequently, the D2D-capable UE is not expected to transmit D2D synchronization signals—denoted as D2DSS—in the downlink (DL) portion of the cellular spectrum. That restriction contrasts with network radio nodes or base stations, referred to as eNodeBs or eNBs in the 3GPP LTE context, which periodically transmit Primary Synchronization Signals, PSS, and Secondary Synchronization Signals, SSS, on the downlink.

The PSS/SSS enable UEs to perform cell search operations and to acquire initial synchronization with the cellular network. The PSS/SSS are generated based on pre-defined sequences with good correlation properties, in order to limit inter-cell interference, minimize cell identification errors and obtain reliable synchronization. In total, 504 combinations of PSS/SSS sequences are defined in LTE and are mapped to as many cell IDs. UEs that successfully detect and identify a sync signal are thus able to identify the corresponding cell-ID, too.

To better appreciate the PSS/SSS configurations used by eNBs on the DL in LTE networks, FIG. 1 illustrates time positions for PSS and SSS in the case of FDD and TDD spectrums. FIG. 2 illustrates PSS generation and the resulting signal structure, FIG. 3 illustrates SSS generation and the resulting signal structure.

FIG. 2 particularly highlights the formation of PSS using Zadoff-Chu sequences. These codes have zero cyclic autocorrelation at all nonzero lags. Therefore, when a Zadoff-Chu sequence is used as a synchronization code, the greatest correlation is seen at zero lag—i.e., when the ideal sequence and the received sequence are synchronized. FIG. 3 illustrates SSS generation and the resulting signal structure. In LTE, the PSS as transmitted by an eNB on the downlink is mapped into the first 31 subcarriers on either side of the DC subcarrier, meaning that the PSS uses six resource blocks, with five reserved subcarriers on each side, as shown in the following figure. Effectively, the PSS is mapped on to the middle 62 subcarriers of the OFDM resource grid at given symbol times, where "OFDM" denotes Orthogonal Frequency Division Multiplexing, in which an overall OFDM signal comprises a plurality of individual subcarriers spaced apart in frequency and where each subcarrier at each OFDM symbol time constitutes one resource element.

As FIG. 3 illustrates, the SSS are generated not using Zadoff-Chu sequences, but rather using M sequences, which are pseudorandom binary sequences generated by cycling through each possible state of a shift register. The shift register length defines the sequence length. SSS generation in LTE currently relies on M-sequences of length 31.

With the above in mind, the following equation defines the physical cell identifier of a given cell in an LTE network, $$N_{ID}^{CELL} = 3N_{ID}^{(1)} + N_{ID}^{(2)},$$

where $N_{ID}^{(1)}$ is the physical layer cell identity group (0 to 167), and where $N_{ID}^{(2)}$ is the identity within the group (0 to 2). As noted, this arrangement defines a cell identifier space of 504 values. The PSS is linked to the cell identity within the group $N_{ID}^{(2)}$, while the SSS is linked to the cell identity within the group $N_{ID}^{(1)}$ and the cell identity within the group $N_{ID}^{(2)}$. In particular, the PSS is a Zadoff-Chu sequence of complex symbols having length-62. There are three root sequences, indexed by the cell identity within the group $N_{ID}^{(2)}$. As for the SSS, two length-31 sequences are scrambled as a function of the cell identity from the group $N_{ID}^{(1)}$ and from the group $N_{ID}^{(2)}$. A receiver obtains the cell identity conveyed by the PSS and SSS by demodulating the PSS to obtain the value within the group $N_{ID}^{(2)}$ and then uses that knowledge to demodulate the SSS to obtain the value within the group $N_{ID}^{(1)}$.

Because of the desirable properties of the Zadoff-Chu and M sequences used to generate the PSS and SSS in LTE, and because of the preexisting investment in algorithms and associated device-side processing as just outlined, there is an express interest in reusing these "legacy" PSS/SSS signal generation and detection techniques for D2D Synchronization Signals, D2DSS. Further aspects of D2DSS were considered at the TSG RAN1 #74bis meeting of the Technical Specifications Group or TSG responsible for the Radio Access Network (RAN) in 3GPP. TSG RAN is responsible for defining the functions, requirements and interfaces of the Universal Terrestrial Radio Access Network (UTRAN) and the Evolved UTRAN (E-UTRAN), for both FDD and TDD modes of operation. The following working assumptions were set forth in the meeting:

Synchronization sources transmit at least a D2DSS: D2D Synchronization Signal
  a. May be used by D2D UEs at least to derive time/frequency
  b. May (FFS) also carry the identity and/or type of the synchronization source(s)
  c. Comprises at least a PD2DSS
    i. PD2DSS is a ZC sequence
    ii. Length FFS
  d. May also comprise a SD2DSS
    i. SD2DSS is an M sequence
    ii. Length FFS As a concept for the purpose of further discussion, without implying that such a channel will be defined, consider a Physical D2D Synchronization Channel or PD2DSCH:
  e. May carry information including one or more of the following (For Further Study or FFS):
    i. Identity of synchronization source
    ii. Type of synchronization source
    iii. Resource allocation for data and/or control signaling
    iv. Data
    v. others FFS A synchronization source is any node transmitting D2DSS
  f. A synchronization source has a physical identity PSSID
  g. If the synchronization source is an eNB the D2DSS is Rel-8 PSS/SSS
  h. Note: in RAN1#73, "synchronization reference" therefore means the synchronization signal(s) to which T1 relates, transmitted by one or more synchronization source(s).

Even though a range of different distributed synchronization protocols are possible, one option under consideration by the 3GPP is based on hierarchical synchronization with the possibility of multi-hop sync-relay. In short, some nodes adopt the role of synchronization masters—sometimes referred to as Synchronization Heads (SH) or as Cluster Heads (CH)—according to a distributed synchronization algorithm. If the synchronization master is a UE, it provides synchronization by transmitting D2DSS and/or PD2DSCH. If the synchronization master is an eNB it provides synchronization by PSS/SSS and broadcast control information, such as being sent using MIB/SIB signaling, where MIB denotes "Master Information Block" and SIB denotes "System Information Block."

The synchronization master is a special case of synchronization source that acts as an independent synchronization source, i.e., it does not inherit synchronization from other nodes by use of the radio interface. UEs that are under coverage of a synchronization source may, according to predefined rules, transmit D2DSS and/or PD2DSCH themselves, according to the synchronization reference received by their synchronization source. They may also transmit at least parts of the control information received from the synchronization master by use of D2DSS and/or PD2DSCH. Such a mode of operation is referred to herein as "sync-relay" or "CP-relay."

It is also helpful to define a "synchronization reference" as a time and/or frequency reference associated with a certain synchronization signal. For example, a relayed synchronization signal is associated with the same synchronization reference as the sync signal in the first hop.

A number of advantages or benefits flow from reusing legacy PSS/SSS for D2DSS. sync signals. For example, because UEs must already detect and process PSS/SSS signals transmitted from eNBs in the network, substantially the same algorithms and processing can be reused for detecting D2DSS if the same PSS/SSS sequences are used for D2DSS. However, it is recognized herein that a number of potential issues arise with such reuse.

Consider, for example, the assumption that the cell-ID [0, . . . , 503] identifies a synchronization reference or source provided from an eNB operating in an LTE network. In a similar fashion, one assumes that a D2D identity will be used to identify a synchronization reference or source provided from a D2D-enabled UE. The D2D-identity may be significantly longer than the cell-ID, e.g., 16 bits or more, and it cannot be mapped to the D2DSS without significantly degrading sync detection performance.

SUMMARY

In one aspect of the teachings herein, a transmitter transmits synchronization signals according to one or more defined transmission characteristics that enable a receiver to distinguish the type of transmitter and/or the type of carrier used to convey the synchronization signals. Different types of transmitters reuse at least some of the same synchronization signal sequences and generation algorithms, but use different transmission parameters to impart one or more recognizable characteristics to the transmitted synchronization signals. In turn, an appropriately configured receiver "knows" which characteristics are associated with which transmitter and/or carrier types. For example, wireless devices operating in a wireless communication network transmit device-generated synchronization signals that reuse at least some of the same sequences used by network base stations for the transmission of network synchronization signals. However, device-generated synchronization signals are transmitted using a relative positioning or mapping that characteristically differs from that used for network synchronization signals.

In one example, a wireless device is configured for operation in a wireless communication network and implements a method that includes detecting synchronization signals received at the wireless device, and deciding from a relative positioning or mapping of the received synchronization signals whether they are network synchronization signals originating from a base station, or are device-generated synchronization signals originating from another wireless device. Correspondingly, the wireless device is configured to process the received synchronization signals according to first processing procedures when they are decided to be network synchronization signals, and according to second processing procedures when they are decided to be device-generated synchronization signals.

In another example, a wireless device configured for operation in a wireless communication network includes a communication interface configured for receiving signals from base stations in the network and from other wireless devices. The wireless device further includes a processing circuit that is operatively associated with the communication interface and configured to detect synchronization signals received at the wireless device, and decide from a relative positioning or mapping of the synchronization signals whether they are network synchronization signals originating from a base station, or are device-generated synchronization signals originating from another wireless device. Correspondingly, the processing circuit is configured to process the received synchronization signals according to first processing procedures when they are decided to be network synchronization signals, and according to second processing procedures when they are decided to be device-generated synchronization signals.

In another example, a wireless device configured for operation in a wireless communication network implements a method of transmitting device-generated synchronization signals. The method includes generating the device-generated synchronization signals using at least a subset of the same sequences used by base stations in the network for network synchronization signals. The method further includes transmitting device-generated synchronization signals according to a relative positioning or mapping that enable a receiving wireless device to determine that they are device-generated synchronization signals rather than network synchronization signals originating from a base station in the wireless communication network.

In a corresponding embodiment, a wireless device configured for operation in a wireless communication network comprises a communication interface configured for transmitting signals to network base stations and for transmitting signals to other wireless devices, and further includes a processing circuit. The processing circuit is operatively associated with the communication interface and is configured to generate device-generated synchronization signals using at least a subset of the same sequences used by base stations in the network for generating network synchronization signals. Further, the processing circuit is configured to transmit the device-generated synchronization signals according to a relative positioning or mapping that enable a receiving wireless device to determine that they are device-generated synchronization signals rather than network synchronization signals originating from a base station in the wireless communication network.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
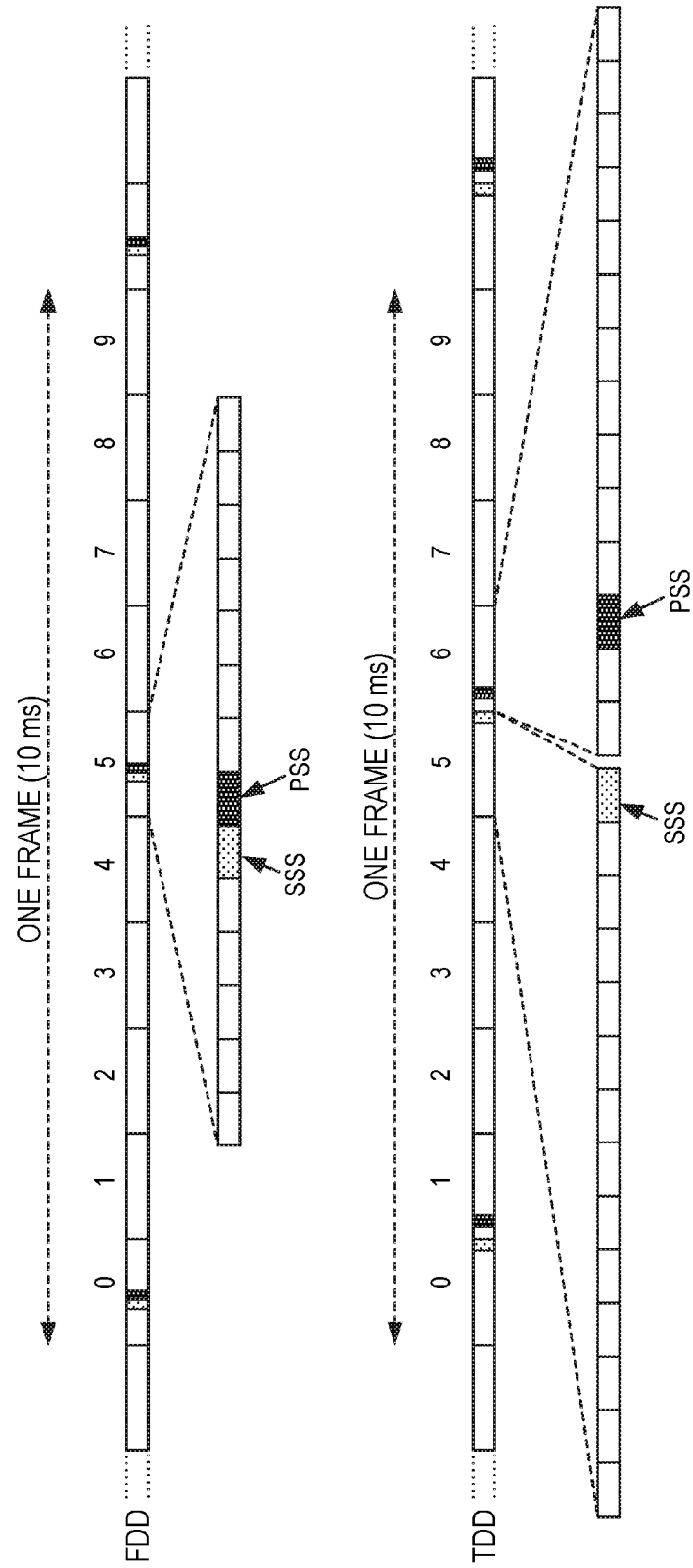
FIG. 1 is diagram illustrating the known transmission timing for primary and secondary synchronization signals transmitted on the downlink in a Long Term Evolution, LTE, network for Time Division Duplex, TDD, and Frequency Division Duplex, FDD, modes.
Figure 2:
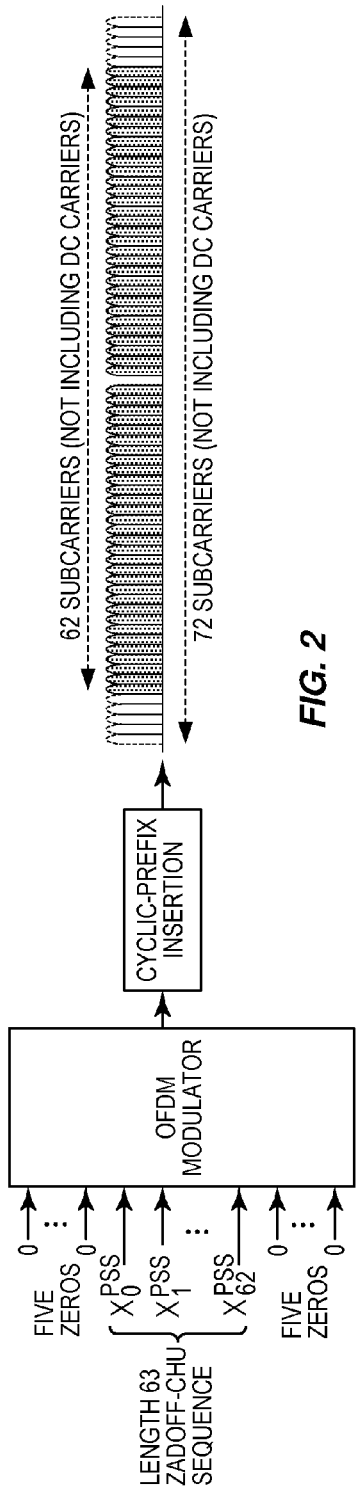
FIG. 2 is a diagram illustrating the generation and structure of a primary synchronization signal, as is known for network base stations operating in an LTE network.
Figure 3:
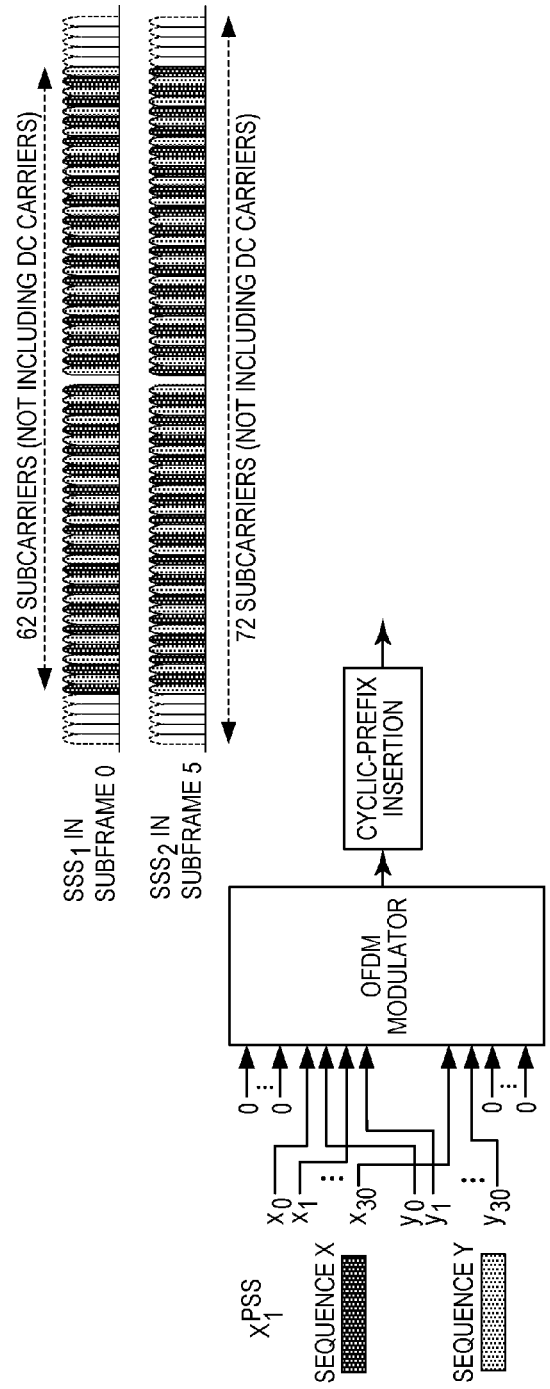
FIG. 3 is a diagram illustrating the generation and structure of a secondary synchronization signal, as is known for network base stations operating in an LTE network.
Figure 4:
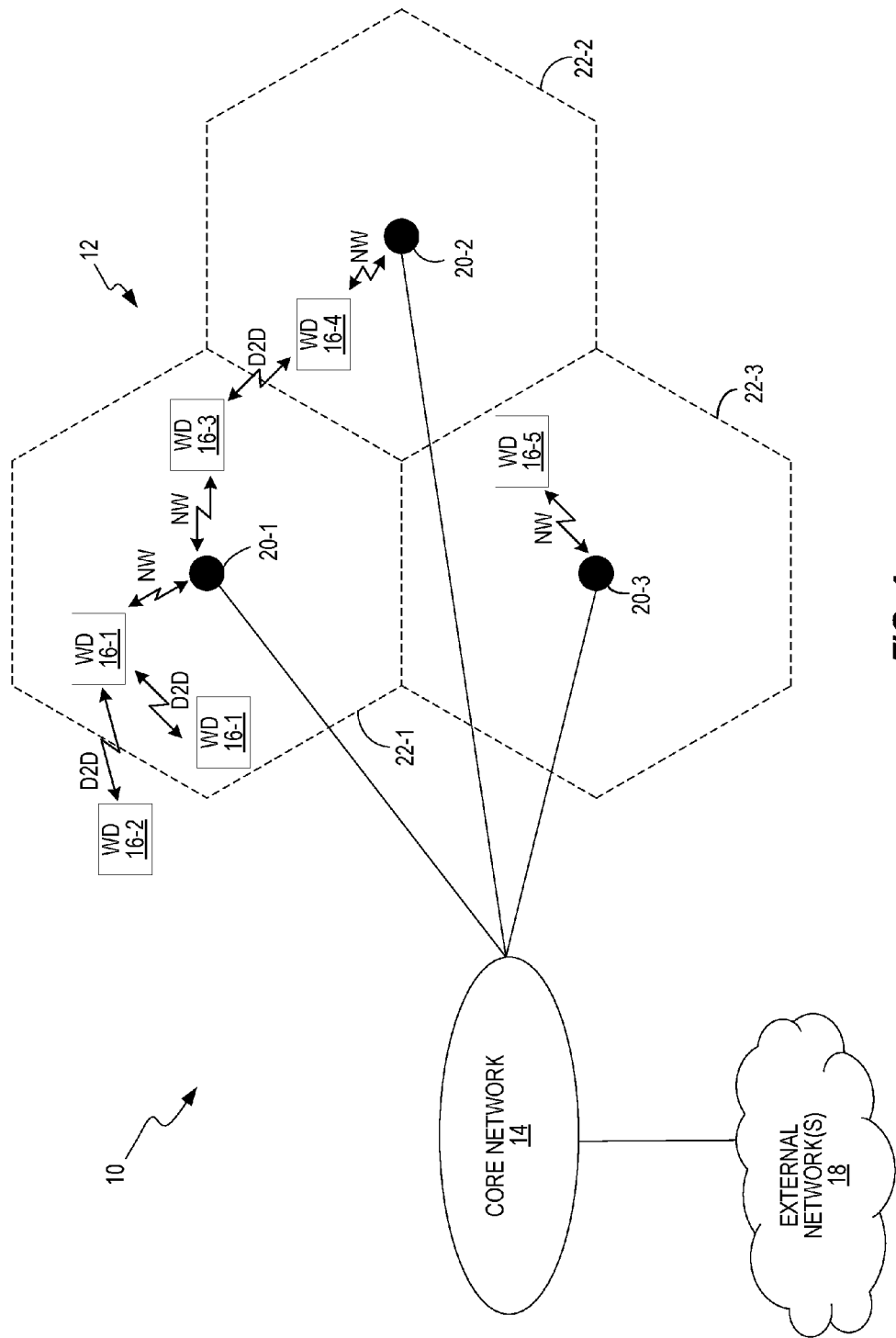
FIG. 4 is a block diagram of one embodiment of a wireless communication network, where one or more wireless devices are configured according to the teachings herein.

FIG. 4 illustrates one embodiment of a wireless communication network 10 that includes a Radio Access Network, RAN, 12 and a Core Network, CN, 14. The network 10 communicatively couples wireless devices 16 to one or more external networks 18, such as the Internet or another packet data network. The diagram is simplified for ease of discussion and it will be appreciated that the network 10 may include additional examples of any one or more of the illustrated entities and may include other entities not illustrated. For example, the CN 14 may include Mobility Management Entities or MMEs, Serving Gateways or SGWs, a Packet Gateway or PGW, and one or more other nodes, such as positioning nodes, Operations & Maintenance nodes, etc.

The RAN 12 includes a number of base stations 20-1, 20-2 and 20-3, which in the LTE context are referred to as eNBs or eNodeBs. Unless suffixes are needed for clarity, the reference number "20" will be used to refer to base stations in the singular and plural sense. Each base station 20 uses certain air interface resources—e.g., spectrum, carriers, channels, etc.—to provide service over a given area, referred to as a "cell." Accordingly, in FIG. 4, the base station 20-1 provides a cell 22-1, the base station 20-2 provides a cell 22-2, and the base station 20-3 provides a cell 22-3. Unless suffixes are needed for clarity, the reference number "22" will be used herein to refer to cells in the singular and plural sense.

Of course, a given base station 20 may provide more than one cell 22, e.g., in the case of multi-carrier operation, and the teachings herein are not limited to arrangement of base stations 20 and cells 22 depicted in FIG. 4. For example, the cell sizes may be adaptive or non-uniform. In the latter case, the network 10 may comprise a heterogeneous network where one or more large cells, referred to as "macro" cells are overlaid by one or more smaller cells, referred to a "micro," "pico," or "femto," cells. These smaller cells are provided by low-power access points and may be used as service hotspots that provide higher data rate services and/or may be used to extend or fill in the service coverage provided by the macro cells. In some heterogeneous deployments, the micro cells use the same radio access technology used by the macro cells, e.g., LTE-based micro cells overlaying LTE-based macro cells.

Figure 5:
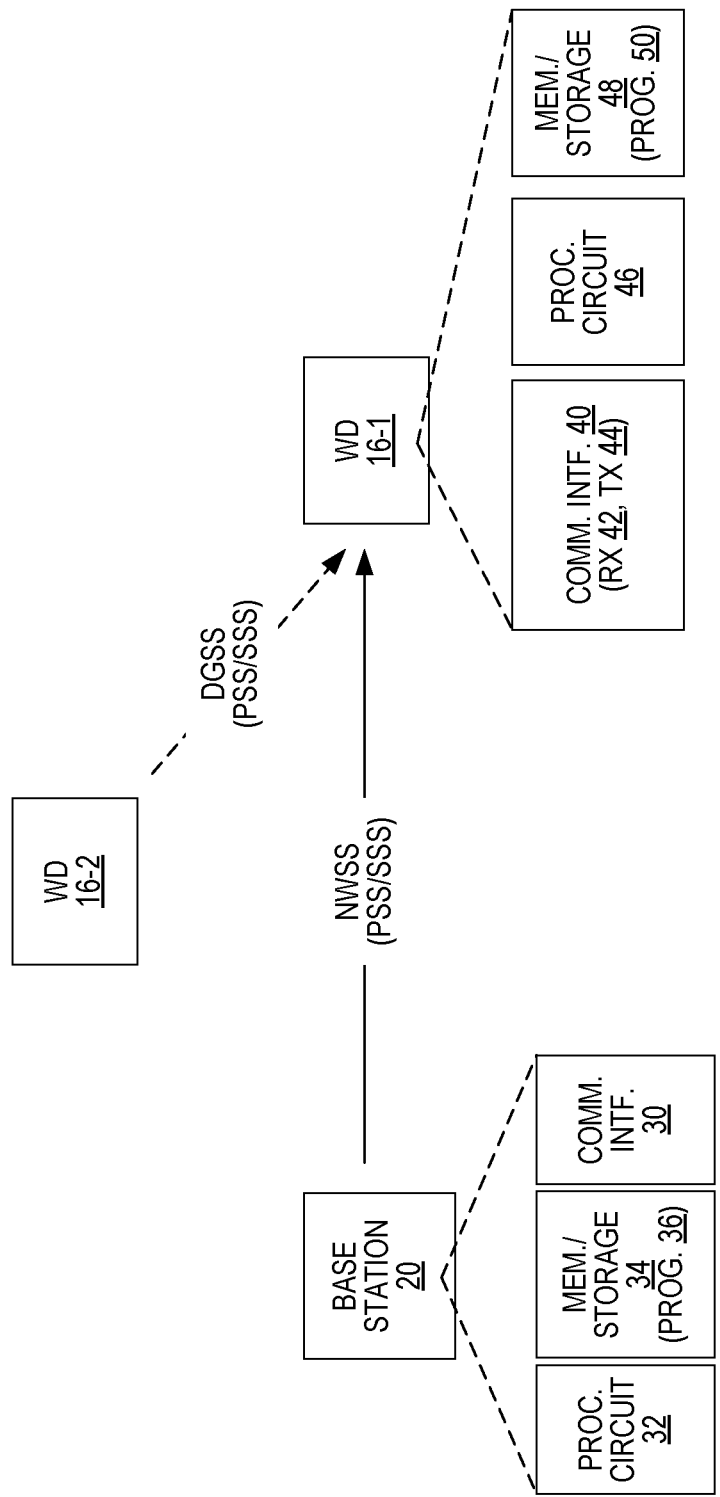
FIG. 5 is a block diagram of one embodiment of example details for a base station, such as an eNB in an LTE network, and a wireless device configured according to the teachings herein.

FIG. 5 illustrates example details for one embodiment of a base station 20 and a wireless device 16-1, which is shown in context with another wireless device 16-2. Those of ordinary skill in the art will appreciate that FIG. 5 illustrates functional and/or physical circuit arrangements and that the base station and the wireless device 16-1 generally will include digital processing circuits (and associated memory or other computer-readable medium) for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions.

One sees from the example that the base station 20 includes a communication interface 30, a processing circuit 32 and associated memory/storage 34 (e.g., one or more types of computer-readable medium, such as a mix of volatile, working memory and non-volatile configuration and program memory or storage). The communication interface(s) 30 depend on the nature of the base station 20, but generally include a radio transceiver (e.g., pools of radio transmission, reception, and processing circuitry) for communicating with any number of wireless devices 16 in any one or more cells 22 provided by the base station 20. In that example, the communication interface(s) 30 include one or more transmitters and receivers, e.g., cellular radio circuits, along with power control circuitry and associated signal processing circuitry. Further, in the same scenario, the communication interface(s) 30 may include inter-base-station interfaces and/or backhaul or other CN communication interfaces.

The processing circuit 32 comprises, for example, digital processing circuitry that is fixed or programmed to perform network-side processing as taught herein. In one embodiment, the processing circuit 32 comprises one or more microprocessors, Digital Signal Processors (DSPs), ASIC, FPGAs, etc., which are configured according to the teachings herein. In a particular embodiment, the memory/storage 34 stores a computer program 36. In an example embodiment, the processing circuit 32 is at least partly configured according to the teachings herein, based on its execution of the computer program instructions comprising the computer program 36. In this regard, the memory/storage 34 will be understood as comprising a computer-readable medium providing non-transitory storage for the computer program 36.

Turning to the example wireless device 16-1, which may be a cellular radiotelephone (smartphone, feature phone, etc.), a tablet or laptop computer, a network adaptor, card, modem or other such interface device, or essentially a device or other apparatus that is configured for wireless communication in the network 10. In the 3GPP context, the wireless device 16-1 is referred to as a UE, and it will be understood as including a communication interface 40, including a radiofrequency receiver 42 and a radiofrequency transmitter 44 that are configured for operation according to the air interface of the network 10.

The wireless device 16-1 further includes a processing circuit 46, which includes or is associated with memory/storage 48. The memory/storage 48 includes, for example, one or more types of computer-readable medium, such as a mix of volatile, working memory and non-volatile configuration and program memory or other storage. Similarly, those of ordinary skill in the art will appreciate that the communication interface 40 may comprise a mix of analog and digital circuits. For example, the receiver 42 in one or more embodiments comprises a receiver front-end circuit— not explicitly shown in the diagram—that generates one or more streams of digital signal samples corresponding to antenna-received signal or signals, along with one or more receiver processing circuits—e.g., baseband digital processing circuitry and associated buffer memory—which operate on the digital samples. Example operations include linearization or other channel compensation, possibly with interference suppression, and symbol demodulation/detection and decoding, for recovering transmitted information.

At least some of the digital baseband processing for the receive (RX) signals and transmit (TX) signals received and transmitted through the communication interface 40 may be implemented in the processing circuit 46. The processing circuit 46 in this regard comprises digital processing circuitry and may be implemented as one or more microprocessors, DSPs, ASICs, FPGAs, etc. More generally, the processing circuit 46 may be implemented using fixed circuitry or programmed circuitry. In an example embodiment, the memory/storage 48 comprises a computer-readable medium that stores a computer program 50 in a non-transitory manner. The processing circuit 46 in such embodiments is at least partly configured according to the teachings herein, based on its execution of the computer program instructions comprising the computer program 50.

Note that with respect to transmit-related details herein for the transmission of device-generated synchronization signals from a wireless device 16, e.g., for use in Device-to-Device, D2D, communications between wireless devices 16, the wireless device 16-2 shown in FIG. 5 may be understood as having the same or similar implementation as the wireless device 16-1. In other words the processing circuit 46 and other supporting circuitry within any given wireless device 16 may be configured to carry out the synchronization signal receive processing taught herein and/or the synchronization signal transmit processing taught herein.

Figure 6:
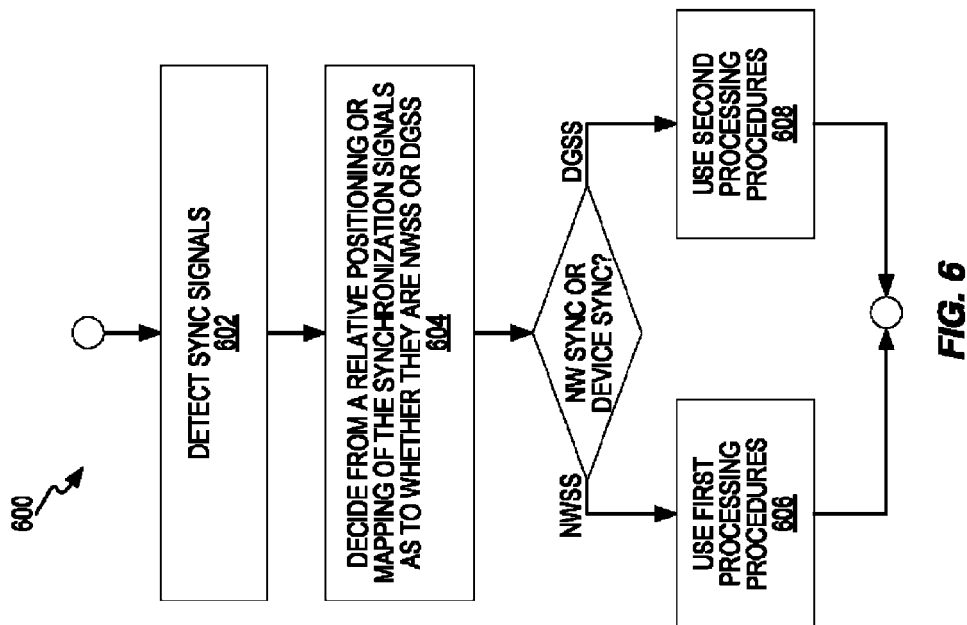
FIG. 6 is a logic flow diagram of one embodiment of a method of processing received synchronization signals at a wireless device.

With respect to example details for synchronization signal receive processing as contemplated for a wireless device 16 or other receiver herein, FIG. 6 illustrates an example embodiment of a method 600 of processing received synchronization signals. It will be appreciated that the processing indicated in FIG. 6 may be implemented at least in part via programmatic configuration, based on the execution of stored computer program instructions, e.g., by the execution of the stored computer program 50 by the processing circuit 46, as shown in FIG. 5 for the wireless device 16-1. It will also be appreciated that FIG. 6 does not necessarily imply a specific or required processing order and that one or more of the illustrated method steps may be performed in an order different from the illustration. Further, the method 600 or included steps therein may be performed in parallel, repeated or otherwise looped on a periodic or triggered basis, and/or may be performed in an ongoing sense, e.g., as part of ongoing or background processing.

For ease of reference in the further examples given below, the following summary of terms and understandings apply:

NWSS denotes network synchronization signals, e.g., PSS and SSS as transmitted by a base station 20;

DGSS denotes device-generated synchronization signals, and the "D2DSS" denotes such signals for D2D synchronization; note that DGSS may comprise PSS and SSS as transmitted by a wireless device 16;

PSS and SSS denote primary and secondary synchronization signals, irrespective of whether they are NWSS or D2DSS;

PDGSS or PD2DSS denotes a PSS as transmitted by a wireless device 16; and

SDGSS or SD2DSS denotes a SSS as transmitted by a wireless device 16.

Note that the legacy LTE PSS and LTE SSS used by eNBs in LTE networks are special cases of PD2DSS and SD2DSS, respectively.

The method 600 includes detecting (602) synchronization signals received at the wireless device 16 and deciding (Block 604) from a relative positioning or mapping of the synchronization signals as to whether they are NWSS originating from a base station, or are DGSS originating from another wireless device 16. If it is decided that the synchronization signals are NWSS, the method 600 continues with processing (Block 606) the received synchronization signals according to first processing procedures, e.g., using rules or processing actions associated with or otherwise defined for the receipt of NWSS. Conversely, if it is decided that the synchronization signals are DGSS, the method 600 continues with processing (Block 608) the received synchronization signals according to second processing procedures, e.g., using rules or processing actions associated with or otherwise defined for the receipt of DGSS.

In one example, the received synchronization signals are a newly detected synchronization signal, and the first and/or the second processing procedures include deciding whether or not to update the synchronization reference of the wireless device 16 to the newly detected synchronization signal.

In another example applicable to at least some embodiments, the second processing procedures may include attempting to decode a Physical D2D Synchronization Channel, PD2DSCH, that is transmitted when the synchronization signals are DGSS. That is, recognizing that the received synchronization signals are DGSS may trigger an attempt to decode an associated PD2DSCH.

Such procedures include processing one or more parameters obtained from decoding the PD2DSCH. In more detail, if the received synchronization signals are NWSS, then the wireless device 16 knows that no PD2DSCH is transmitted in association with them. On the other hand, if the received synchronization signals are DGSS, the wireless device 16 may assume that a PD2DSCH is transmitted in association with them. In at least some embodiments, the PD2DSCH is transmitted according to a known relationship relative to the DGSS, and the wireless device 16 thus knows where to find the PD2DSCH.

In a further example, the first processing procedures include first rules for synchronizing one or more timings of the wireless device with respect to NWSS, and the second processing procedures include second rules for synchronizing one or more timings of the wireless device with respect to D2DSS. These rules dictate, for example, how to rank synchronization signals in order of preference or priority and/or which synchronization signals to use for synchronizing transmission timing versus reception timing. In this regard, it shall be understood that the wireless device 16 may receive both NWSS and DGSS and may use processing rules to determine how to reconcile that dual reception—e.g., ignore device-generated synchronization when network synchronization is available, use the network synchronization signals for certain device synchronizations and use D2D synchronization signals for certain other device synchronizations, etc. Such rules extend, for example, to instances where DGSS are received from more than one source, or for more than one synchronization reference.

Consider a more detailed example, wherein the received synchronization signals include a primary synchronization signals, PSS, and a secondary synchronization signal, SSS, which are detected by the receiving wireless device 16 as having a distance between them that is characteristic of DGSS transmissions. In such an example, the step of deciding (Block 604) includes deciding that the received synchronization signals are DGSS rather than NWSS, when the distance between the primary synchronization signal and the secondary synchronization signals matches the characteristic distance known for DGSS transmission. It will be understood that this characteristic distance differs from the characteristic distance between PSS and SSS known for NWSS transmissions.

In a particular example, the wireless device 16 decides that received PSS/SSS are DGSS when the PSS/SSS spacing detected for received PSS/SSS differs from the defined distance known to be used by base stations 20 operating in the TDD mode and/or when an ordering of the primary and secondary synchronization signals differs from a defined ordering known to be used by base stations operating in the FDD mode.

Thus, in some embodiments, the "relative positioning or mapping" at issue is the separation of PSS and SSS when transmitted by a base station 20 as NWSS relative to the separation of PSS and SSS when transmitted by a wireless device 16 as DGSS. In one example, PSS and SSS for D2SS are transmitted in adjacent symbol times, while PSS and SSS are transmitted with a separation of three symbol times for NWSS.

In the same or other embodiments, PSS and SSS are transmitted with a first ordering for NWSS and with a second ordering for DGSS. For example, base stations 20 transmit SSS first, followed by PSS, for NWSS transmissions. Conversely, wireless devices 16 transmit PSS first, followed by SSS, for DGSS transmissions. Thus, a receiver distinguishes between NWSS and DGSS based on the PSS/SSS ordering. In such examples, the "relative positioning or mapping" constitutes the positioning order of PSS/SSS for DGSS relative to the positioning order of PSS/SSS for NWSS. That is, the mapping or positioning of the DGSS in terms of time and/or frequency characteristically distinguishes them as DGSS rather than NWSS.

Of course, these characteristic differences can be combined. For example, separation of PSS/SSS indicates whether the synchronization signals in question are NWSS or DGSS, while PSS/SSS ordering indicates a further parameter for DGSS, such as the type, sub-type, or category of the wireless device 16 transmitting the DGSS. Still further, in the case that the received synchronization signals in question include PSS and SSS, the relative positioning or mapping differences between NWSS and DGSS may apply to both PSS/SSS, e.g., taken as a pairing, or may apply to only one of them.

In a further example, wireless devices 16 use a different characteristic mapping of synchronization signals to the time-frequency resources of the OFDM signal conveying them, relative to the mapping used by base stations 20 for SSS transmission. In a particular example, the SSS in a DGSS transmission is mapped differently than the mapping used for the SSS in a NWSS transmission. Thus, a receiver would detect and evaluate the SSS mapping to determine whether the received synchronization signal was a DGSS or a NWSS.

In another embodiment, the relative positioning or mapping in question refers to whether the synchronization signals are positioned in uplink spectrum or in downlink spectrum. In an example embodiment, base stations 20 transmit PSS and SSS as NWSS in the downlink portion of the radio spectrum, while wireless devices 16 transmit PSS and SSS as DGSS in the uplink portion of the radio spectrum. Thus, a receiver detects whether given received PSS and SSS originate from a base station 20 or from a wireless device 16, based on detecting whether the received PSS and SSS are positioned in the uplink spectrum or in the downlink spectrum.

As noted above, the teachings herein also contemplate the use of multiple transmission characteristics together, to indicate more than just carrier type and/or transmitter type. For example, base stations 20 and wireless devices 16 may use a different characteristic spacing for PSS and SSS transmission, such that the spacing of a received PSS and SSS tells the receiver whether the PSS and SSS originate from a base station 20 or from a wireless device 16. Further, different types of wireless devices 16 use the same PSS/SSS spacing but use different characteristic orderings of the PSS and SSS to indicate a wireless device subtype, category, class, etc. For example, PSS followed by SSS indicates one device subtype, while SSS followed by PSS indicates another device subtype.

Figure 7:
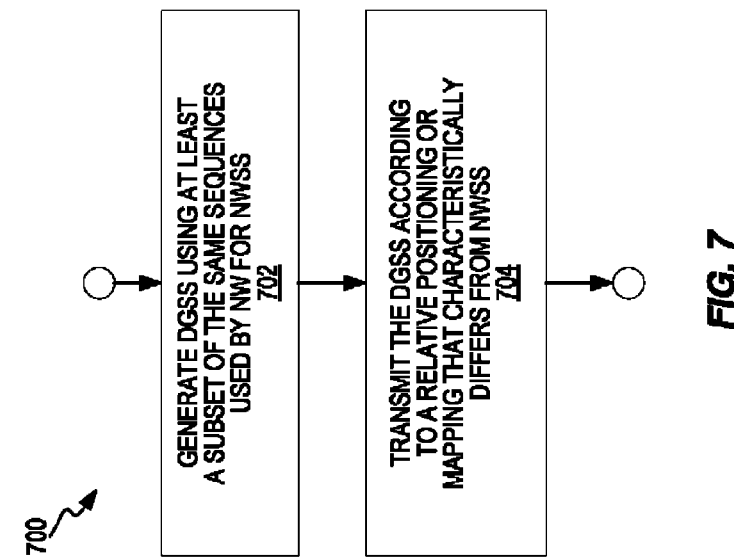
FIG. 7 is a logic flow diagram of one embodiment of a method of transmitting Device-to-Device, D2D, synchronization signals from a wireless device.

Consider FIG. 7, which depicts one embodiment of a method 700 carried out by a wireless device 16, for transmitting D2D synchronization signals. One or more steps of the method 700 may be carried out in an order other than that suggested by the diagram, and the method 700 may be repeated, looped, etc., and may be performed in conjunction with other processing at the wireless device 16.

The method 700 includes generating (Block 702) synchronization signals using at least a subset of the sequences used by the network 10 for generating NWSS. For example, some or all of the same Zadoff-Chu sequences used by base stations 20 for generating PSS are reused by the wireless device 16 for generation of a PSS for DGSS transmission and/or some or all of the same M-sequences used by base stations 20 for generating SSS are reused by the wireless device 16 for generation of an SSS for DGSS transmission. Further, the method 700 includes transmitting (Block 704) the D2D PSS and/or D2D SSS according to a relative positioning or mapping that enables a receiving wireless device 16 to recognize that the synchronization signals are D2D synchronization signals.

It is recognized herein that a receiver receiving synchronization signals benefits from detecting the carrier type on which the synchronization signals are received, and benefits from detecting the transmitter type—i.e., from detecting whether the synchronization signals are NWSS transmitted by a base station 20 or are DGSS transmitted by a wireless device 16. Moreover, as provided for in at least some embodiments disclosed herein, further benefits are obtained by detecting sub-type, class, or category information for the transmitter originating the synchronization signals.

Knowing whether received synchronization signals originate from a base station 20 or from a wireless device 16 and/or knowing the type of carrier on which the received synchronization signals are conveyed allows the receiver to adopt the most suitable procedures for processing and using the received synchronization signals. For example, detecting the carrier type is beneficial for determining which resources are available for transmission, and the decision as to whether the synchronization signals are NWSS or DGSS may be used to control how the signals are decoded and used for synchronization-related processing within the receiver. Further, to the extent that a wireless device 16 can detect the type or subtype of transmitter based on the transmission characteristic(s) of the received PSS/SSS, that knowledge may be exploited for ranking the reliability of different PSS/SSS when multiple PSS/SSS are received from different transmitters of different types or subtypes, and for selecting the most suitable or most preferable signals for synchronizing.

A working assumption in the context of the further examples below is that a wireless device 16 transmitting DGSS reuses at least some of the Zadoff-Chu sequences defined for LTE PSS. The specific sequence used for Primary DGSS, PDGSS, can be determined according to a predefined mapping. Examples of mappings include mapping sequences to at least a device identity—a UE identity—or a synchronization identity. As a further assumption, the wireless device 16 transmits Secondary DGSS, SDGSS, reusing at least some of the M sequences defined for LTE SSS. The specific sequence used for SDGSS can be determined according to a predefined mapping. Examples of mappings include mapping sequences to at least a device identity or a synchronization identity. Thus, a receiving wireless device 16 detects the position of PDGSS, e.g., by time domain correlation and detects the PDGSS sequence identity. Further, the receiving wireless device 16 detects the position of SDGSS, e.g., by time domain correlation, and detects the SDGSS sequence identity.

As a further assumption, for a given wireless device 16 transmitting DGSS, the device transmits PDGSS and SDGSS using a relative positioning that characteristically differs from the positioning used by network base stations for transmitting PSS and SSS. For example, the wireless device 16 may position the PDGSS and the SDGSS in adjacent symbol times, whereas base stations space PSS and SSS by three OFDM symbol times. Different characteristics also may be used to distinguish between FDD and TDD carrier types. Thus, a receiver according to the teachings herein can detect the type of transmitter and/or the type of carrier associated with received PSS/SSS, based on detecting and evaluating one or more characteristics associated with the received PSS/SSS. Advantageously, the receiver takes different corresponding actions according to the detected transmitter and/or carrier type associated with the received PSS/SSS.

In one embodiment, DGSS transmission uses a different transmission order for primary and secondary synchronization signal transmissions than is used by the base stations 20 for NWSS transmission. For example, a wireless device 16 transmitting DGSS transmits the primary synchronization signal, PDGSS, first, followed by the secondary synchronization signal, SDGSS. In contrast, the base stations 20 transmit the SSS first, followed by the PSS, at least for the case where the base stations 20 are operating in the FDD mode. "First" here refers to symbol times. With this approach, a receiver is configured to know the characteristic orderings used for NWSS versus DGSS and thus determines whether the received PSS and SSS are NWSS or DGSS, based on detecting the order of the received PSS and SSS.

In another example embodiment, a wireless device 16 transmitting DGSS transmits the PSS adjacent to the SSS. In contrast, the base stations 20 transmit PSS and SSS spaced apart by three OFDM symbols. The PSS/SSS order is irrelevant as the distance between PSS and SSS is the characteristic of interest here. Thus, a receiver receiving PSS and SSS decides whether the received PSS and SSS are NWSS or DGSS based on the distance between the received PSS and SSS.

In another example embodiment, a wireless device 16 transmitting DGSS transmits the PSS and SSS on the uplink carrier, while base stations 20 transmit PSS and SSS on the downlink carrier. Thus, a receiver receiving PSS and SSS decides whether the received PSS and SSS are NWSS or DGSS based on whether they are received in the downlink portion of the spectrum or in the uplink portion of the spectrum.

In another example embodiment, different mappings of the M sequences—SSS1 and SS2—used to generate the SSS are adopted by the transmitter depending on whether the carrier is of TDD or FDD type and/or if the transmitter is a wireless device 16 or a base station 20. The different mappings may be known from a predefined mapping rule. In one example, SSS1 and SSS2 are mapped respectively to even or odd subcarriers, possibly without counting the DC, or vice-versa. Thus, a receiver receiving PSS and SSS decides whether the received PSS and SSS are NWSS or DGSS and/or detects the carrier type, based on detecting the mapping(s) used for the received PSS and SSS.

In another example embodiment, different mappings of the M sequences—SSS1 and SSS2—are used to enable timing ambiguity resolution. Here, a wireless device 16 transmitting DGSS adopts a different mapping for the SSS1 and SSS2 sequences in dependence on at least the index of the subframe or time resources that carry the SDGSS. For example, SSS1 and SSS2 can be mapped respectively to even and odd subcarriers, possibly without counting the DC, every other SDGSS transmission instance, and SSS1 and SSS2 can be mapped respectively to odd and even subcarriers, possibly without counting the DC, in the remaining SDGSS transmission instances. Thus, a wireless device 16 or other receiver receiving the SDGSS detects the mapping of SSS1 and SSS2 and resolves accordingly the ambiguity in the SDGSS transmission timing. In this regard, note that if DGSS is transmitted with periodicity X ms, the frame position is known with an ambiguity of any multiple of X ms. However, if the parameters (e.g., M sequences mapping) of DGSS are varied every other DGSS transmission, the ambiguity is extended to 2*X ms.

In another embodiment, different mappings of the M sequences—SSS1 and SS2—used to generate the SSS and/or different time and/or frequency domain mappings of the PSS and the SSS to the radio frames are associated with different transmitter types and/or carrier types and possibly other parameters associated with the D2D-enabled carrier and/or the transmitter transmitting the PSS/SSS. Thus, the receiver detects the mapping of PDGSS, SSS1 and SSS2, from the detected mappings obtains the associated information regarding the carrier and the transmitter.

In another embodiment, the set of control fields included in a broadcast control channel, e.g., in a PD2DSCH, are a function of at least the carrier type and/or type of transmitting the synchronization signals associated with the D2D broadcast control channel. For example, a TDD configuration field is only included if the carrier is of TDD type, a sync relay hop number field is only included if transmitter is not of eNB type, a ProSe address field is only included if the transmitter is not of eNB type, or a ProSe address field length is a function of the type of transmitter transmitting the PSS.

The receiver adapts the interpretation of the detected control information bits to the type of carrier and/or type of device transmitting D2DSS and/or PD2DSCH. For example, different fields in the control information may have different lengths depending on the type of carrier and/or type of device and note that in some cases such fields may be absent. In the extreme case, the PD2DSCH may be completely absent. The receiver may adopt different hypotheses in the length of the decoded word, rate matching, scrambling, zero padding, code rate, CRC calculation methodology and any other detection-related hypotheses or algorithm depending on the type of carrier and/or type of transmitter. Information about the type of carrier and/or type of device may be obtained from explicit signaling, pre-configuration, or any of the embodiments in this invention.

In another embodiment, the receiver determines the type of transmitter based on the time periodicity of the received PSS and/or SSS. The receiver needs to first detect multiple consecutive synchronization signal transmissions and subsequently calculate their periodicity. Thus, the characteristic of interest here is periodicity and the receiver would be configured with the knowledge of which periodicities are characteristic of NWSS and which periodicities are characteristic of DGSS.

Also, as previously noted, positioning of the PSS/SSS within the radio spectrum may be used as a distinguishing characteristic. That is, the receiver determines the type of transmitter associated with received PSS/SSS, based on the spectrum in which the PSS/SSS are received. For example, the transmitter type is determined based on whether the PSS/SSS are received in the uplink or downlink portions of the spectrum.

It will be understood that in at least some cases, the receiver may already be aware of the carrier type and/or transmitter type associated with certain PSS/SSS because, e.g., of preconfigured information or prior signaling received from any nodes. Based on such information, the receiver may restrict the number and range of hypotheses that are being tested based on any of the above embodiments when detecting a new PSS/SSS.

Further, it will be appreciated that the above embodiments may be combined in essentially any manner. In some cases, the combination of the embodiments allows a receiver to identify more than two types of transmitters. That is, more than one "dimension" may be used to characterize PSS/SSS transmissions, such as where the distance between PSS and SSS denotes transmitter type and where the ordering of PSS versus SSS denotes transmitter subtype. Such combinations can be advantageously exploited to signal multiple transmitter types and subtypes—e.g. transmitter type is eNB or UE type or UE type 2 or UE type 3, etc. Different UE types may, e.g., have different capabilities and/or different synchronization properties or reliability.

Consider the following example receiver behavior, which assumes that the PSS is immediately followed by the SSS when the PSS and SSS are DGSS transmissions, and which further assumes that base stations 20 use a different spacing for NWSS. Further, it is assumed that different SSS1/SSS2 mappings are used in dependence on carrier type. Thus, a spacing or distance characteristic indicates the type of transmitter transmitting the PSS/SSS, and a mapping characteristic used for SSS1/SSS2 indicates the type of carrier.

Accordingly, a receiver according to one example contemplated herein performs the following processing algorithm:

the receiver detects PSS where the carrier and transmitter types are unknown;

the receiver detects SSS and its position with respect to the PSS hypothesis test 1—the receiver decides that the PSS/SSS do not originate from a base station 20 operating in the TDD mode, based on the characteristic distance between the PSS and SSS;

hypothesis test 2—the receiver decides that the PSS/SSS do not originate from a base station operating in the FDD mode, based on the characteristic ordering of the PSS and SSS;

decision 1—based on hypothesis tests 1 and 2, the receiver concludes that the transmitter is a wireless device 16 and that the PSS/SSS therefore are PDGSS and SDGSS, respectively;

the receiver detects the characteristic mapping of the sequences SSS1 and SSS2 used for the SDGSS, and from that mapping decides whether the carrier type is FDD or TDD; and based on the above decision-making, the receiver knows that the PSS/SSS are DGSS and knows which type of carrier they are conveyed on, and therefore applies the correct decoding algorithm parameters and interprets the detected fields correctly when reading the associated PD2DSCH.

Example Advantages

Among their several advantages, the teachings herein allow reusing most of the preexisting algorithms for LTE sync signal detection, while still allowing a receiver to detect the carrier type associated with received PSS/SSS and/or to detect whether the received PSS/SSS are NWSS or DGSS. These abilities in turn permit a receiver, e.g., a wireless device 16 operating in a wireless communication network 10, to properly decode, process, and use received synchronization signals in dependence on carrier type and/or recognizing whether the received synchronization signals are NWSS or DGSS. Further, in at least some embodiments, the receiver recognizes transmitter subtype, category, etc., which allows further refinement in the processing rules or procedures used by the receiver.

In one aspect, the teachings herein can be understood as using different ways of mapping a D2D identity to DGSS and/or other D2D signals or channels, where the mapping(s) are a function of the type and/or length of the D2D identity, and may use, e.g., different scrambling. If the identity to be carried by the synchronization signals is a cell-ID, the legacy mapping of cell-ID to PSS/SSS is reused even for DGSS. The cell-ID may be carried by the PD2DSCH associated with the DGSS. Additionally, D2D signals/channels, such as the PD2DSCH, Scheduling Assignments, control channels, etc., are scrambled with sequences derived from the cell-ID.

If the identity to be carried by the synchronization signals is a D2D-ID, which IDs typically exceed the 504 values provided for with legacy LTE PSS/SSS, an abbreviated D2D identity is derived from the full D2D-ID. The abbreviated D2D-ID, "D2D-ID-short," may be limited to the [0 . . . 503] range, for example. According to one embodiment, D2D-ID-short is obtained by hashing or truncating the full D2D-ID. The legacy mapping of D2D-ID-short to PSS/SSS is for DGSS, although the full D2D-ID may be carried by the PD2DSCH associated with the DGSS. Additionally, D2D signals/channels, such as PD2DSCH, Scheduling Assignments, control channels, etc., may be scrambled with sequences derived from the D2D-ID-short.

In any case, in at least some embodiments herein, a wireless device 16 generates synchronization signals using at least a subset of the same sequences used by base stations in the network 10 for generating network synchronization signals. Advantageously, however, the wireless device 16 transmits the synchronization signals according to a relative positioning or mapping that enables a receiver—e.g., another wireless device 16—to recognize that the synchronization signals are D2D synchronization signals originating from a wireless device 16, rather than network synchronization signals originating from a base station 20. Here, the term "relative positioning or mapping" denotes the fact that D2D synchronization signals have a different positioning or mapping relative to that used for network synchronization signals.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of transmitting device-generated synchronization signals from a wireless device configured for operation in a wireless communication network, said method comprising:
   generating the device-generated synchronization signals using at least a subset of the same sequences used by base stations in the network for generating network synchronization signals;
   transmitting the device-generated synchronization signals according to a relative positioning or mapping that characteristically differs from a relative positioning or mapping used for transmitting the network synchronization signals originating from any of the base stations in the wireless communication network; and
   including or omitting one or more control fields in a Device-to-Device (D2D) broadcast control channel transmitted by the wireless device in association with transmission of the device-generated synchronization signals, wherein the control field omissions or inclusions characteristically distinguish the D2D broadcast control channel from network broadcast control channel transmissions by any of the base stations in association with their respective transmissions of the network synchronization signals.

2. The method of claim 1, wherein transmitting the device-generated synchronization signals includes transmitting primary and secondary device-generated synchronization signals according to an ordering that characteristically differs from an ordering used by the network for the transmission of the primary and secondary network synchronization signals.

3. The method of claim 2, wherein transmitting the primary and secondary device-generated synchronization signals comprises transmitting the primary device-generated synchronization signal, followed by transmission of the secondary device-generated synchronization signal, whereas, with respect to the transmission of the primary and secondary network synchronization signals from any given base station, transmission of the primary network synchronization signal follows transmission of the secondary network synchronization signal.

4. The method of claim 1, wherein transmitting the device-generated synchronization signals include transmitting primary and secondary device-generated synchronization signals according to a spacing or distance that characteristically differs from a spacing or distance used by the network for the transmission of primary and secondary network synchronization signals.

5. The method of claim 1, wherein the network synchronization signals comprise primary and secondary network synchronization signals, with transmission of the secondary network synchronization signal characteristically mapped to a downlink carrier, and wherein transmitting the device-generated synchronization signals comprises transmitting primary and secondary device-generated synchronization signals, including mapping transmissions of the secondary device-generated synchronization signal to an uplink carrier.

6. The method of claim 1, wherein the device-generated synchronization signals are transmitted in accordance with a relative positioning that characteristically differs from the relative positioning used for transmitting the network synchronization signals.

7. The method of claim 6, wherein the device-generated synchronization signals are transmitted in accordance with additionally a relative mapping that characteristically differs from the relative mapping used for transmitting the network synchronization signals.

8. The method of claim 1, wherein transmitting the device-generated synchronization signals includes transmitting secondary device-generated synchronization signals in accordance with a relative positioning or mapping that characteristically differs from the relative positioning or mapping used for transmitting the secondary network synchronization signals.

9. A wireless device configured for operation in a wireless communication network and comprising:
a communication interface configured for transmitting signals to base stations of the network and for transmitting signals to other wireless devices; and
a processing circuit that is operatively associated with the communication interface and configured to:
generate device-generated synchronization signals using at least a subset of the same sequences used by the base stations in the network for generating network synchronization signals;
transmit the device-generated synchronization signals according to a relative positioning or mapping that characteristically differs from a relative positioning or mapping used for transmitting the network synchronization signals originating from any of the base stations in the wireless communication network; and
include or omit one or more control fields in a Device-to-Device (D2D) broadcast control channel transmitted by the wireless device in association with transmission of the device-generated synchronization signals, wherein the control field omissions or inclusions characteristically distinguish the D2D broadcast control channel from network broadcast control channel transmissions by any of the base stations in association with their respective transmissions of the network synchronization signals.

10. The wireless device of claim 9, wherein the processing circuit is configured to transmit the device-generated synchronization signals by transmitting primary and secondary device-generated synchronization signals according to an ordering that characteristically differs from an ordering used by the network for the transmission of primary and secondary network synchronization signals.

11. The wireless device of claim 10, wherein the processing circuit is configured to transmit the primary and secondary device-generated synchronization signals by transmitting the primary device-generated synchronization signal, followed by transmission of the secondary device-generated synchronization signal, whereas, with respect to the transmission of the primary and secondary network synchronization signals from any given base station, transmission of the primary network synchronization signal follows transmission of the secondary network synchronization signal.

12. The wireless device of claim 9, wherein the processing circuit is configured to transmit the device-generated synchronization signals by transmitting primary and secondary device-generated synchronization signals according to a spacing or distance that characteristically differs from a spacing or distance used by the network for the transmission of primary and secondary network synchronization signals.

13. The wireless device of claim 9, wherein the network synchronization signals comprise primary and secondary network synchronization signals, with transmission of the secondary network synchronization signal characteristically mapped to a downlink carrier, and wherein the processing circuit is configured to transmit the device-generated synchronization signals by transmitting primary and secondary device-generated synchronization signals, including mapping transmissions of the secondary device-generated synchronization signal to an uplink carrier.

14. The wireless device of claim 9, wherein the processing circuit is configured to transmit the device-generated synchronization signals in accordance with a relative positioning that characteristically differs from the relative positioning used for transmitting the network synchronization signals.

15. The wireless device of claim 14, wherein the processing circuit is configured to transmit the device-generated synchronization signals in accordance with a relative mapping that characteristically differs from the relative mapping used for transmitting the network synchronization signals.

16. The wireless device of claim 9, wherein the processing circuit is configured to transmit secondary device-generated synchronization signals in accordance with a relative positioning or mapping that characteristically differs from the relative positioning or mapping used for transmitting the secondary network synchronization signals.

* * * * *